July 16, 1957 E. L. BALLARD 2,799,301
GRAIN BAGGING DEVICE
Filed Feb. 25, 1955 2 Sheets-Sheet 1

Edwin L. Ballard
INVENTOR

July 16, 1957 — E. L. BALLARD — 2,799,301
GRAIN BAGGING DEVICE
Filed Feb. 25, 1955 — 2 Sheets-Sheet 2

Edwin L. Ballard
INVENTOR
BY ⟨signature⟩
ATTORNEYS.

2,799,301

GRAIN BAGGING DEVICE

Edwin L. Ballard, Lansing, Mich.

Application February 25, 1955, Serial No. 490,545

1 Claim. (Cl. 141—317)

This invention relates to a grain bagging device for a combine, grain elevator or any place where a bagging device of this kind is to be used.

It is a principal object of this invention to provide a grain bagging device of the kind to be more particularly described hereinafter whereby the efforts of but one person will be needed to fill a plurality of receptacles, as bags, with grain before being removed from the combine or other farm objects.

Another object of this invention is to provide a bagging device of this kind which will result in much more effort or time for the operator of the combine, or other farm implements, yet result in the bagging of the grain which is to be shipped or otherwise taken from the combine and farm.

Other and further objects and advantages of the invention will be hereinafter described and the novel features thereof defined in the appended claim.

In the drawings:

Fig. 7 is a plan view of a hand actuated lever for the grain feeding device used in combination with or separate from the grain feed bagging device.

Figure 1:
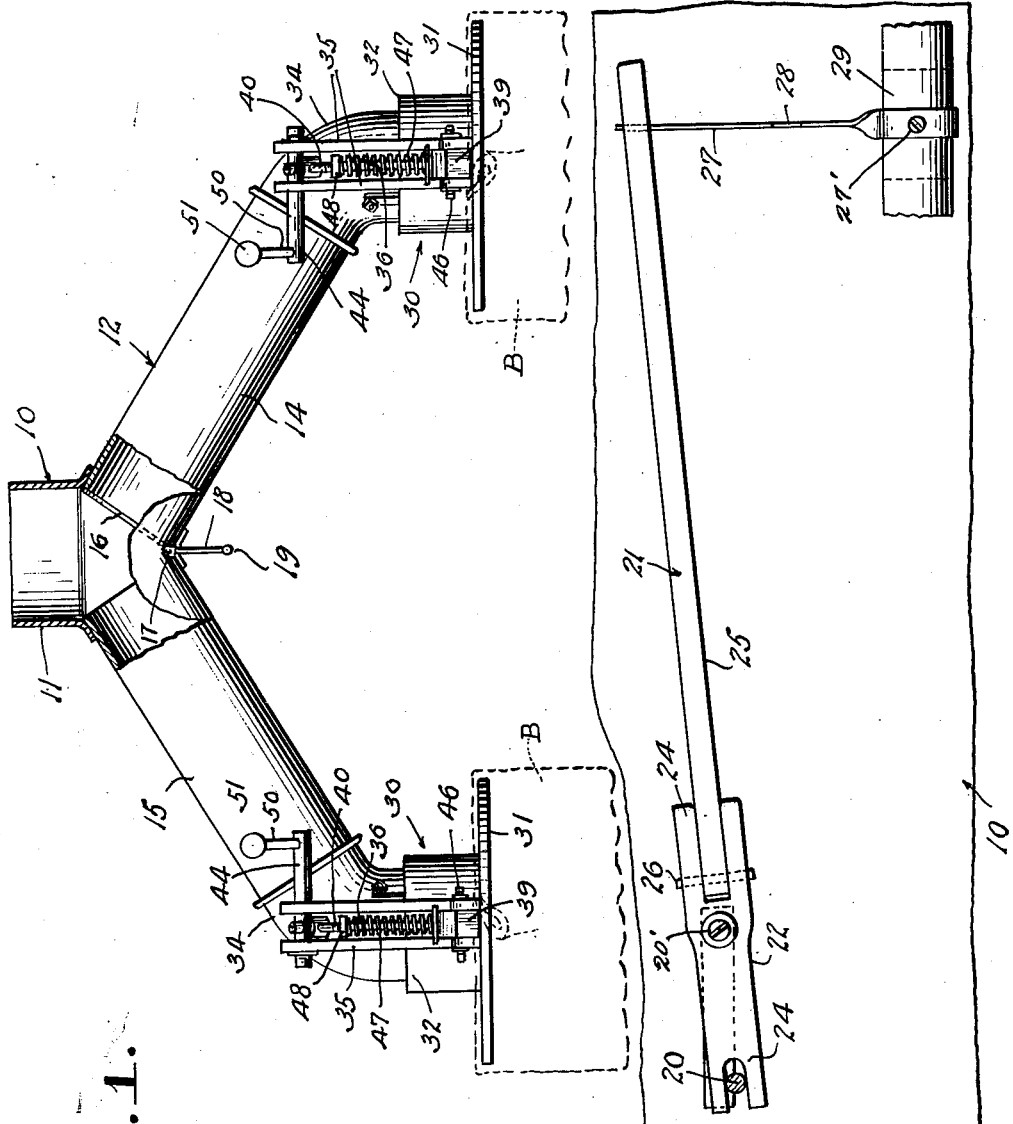
Fig. 1 is a side elevation, partly broken away and partly in section, of a grain bagging device constructed in accordance with an embodiment of my invention.
Figure 2:
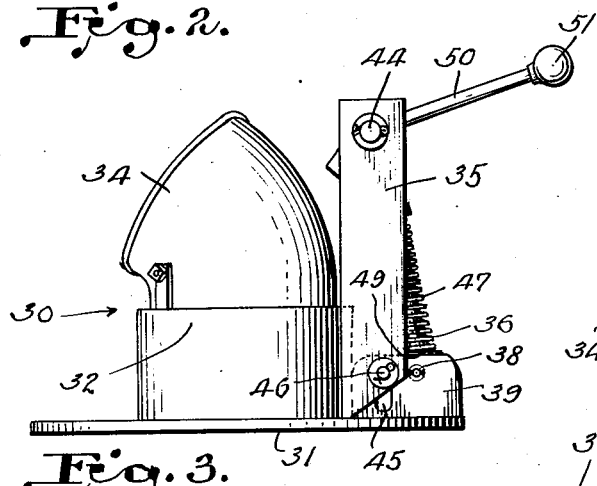
Fig. 2 is a side elevation of the invention removed from a combine or other device containing the grain to be bagged for bagging the grain thereon in the grain clamping engaging position.
Figure 5:
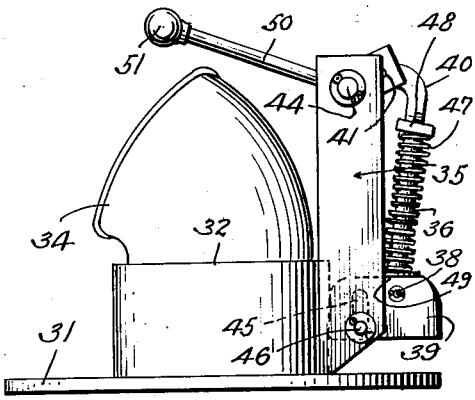
Fig. 5 is a side elevation of the device in its opposite, open, position shown opposite to that in Figs. 2, 3 and 4.
Figure 3:
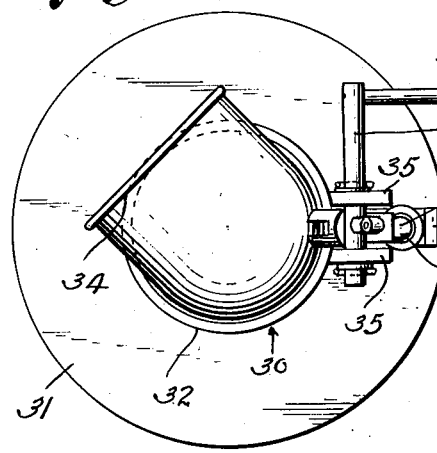
Fig. 3 is a top plan view of the bagging device shown in Fig. 1.
Figure 6:
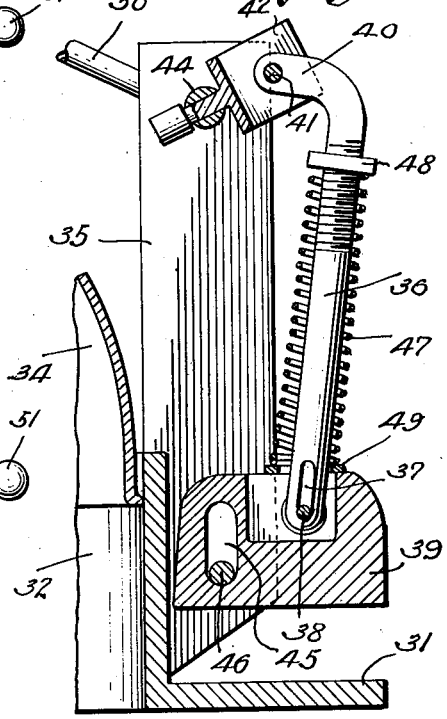
Fig. 6 is an enlarged vertical longitudinal section of my invention shown in Fig. 5.
Figure 4:
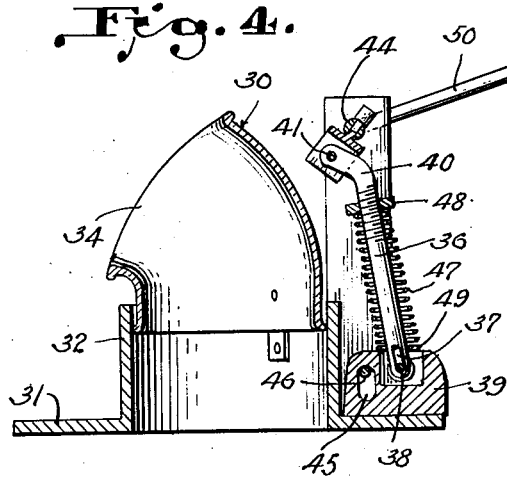
Fig. 4 is a vertical longitudinal section of my invention.

At the present time a separate control is used on a combine both for feeding the grain therefrom and for packing the grain in a bag thus requiring the work of at least two persons for operating the combine and for bagging the grain. Ordinarily the combine will move the grain toward one end from which the grain could be bagged, this type of combine having a screw conveyor therein which will convey the grain to the end of the combine from which the grain is to be bagged. As related above it is an object of this invention to provide a combine of this kind having a grain distributing device and a bagging device all under the control of a single operator, the control of the grain feeding device being operative by the hand of the operator and the bagging device being operative by the hands of the same operator at the same or different time while the operator is removed from the combine.

Referring more specifically to the drawings, the numeral 10 is a grain inlet pipe of a combine which thrashes the grain and has a bagging means on the spout 11 thereof.

There is provided a transversely extending grain conveying tube 12 at the lower end of the spout 11 with the spout engaging the tube intermediate the length thereof. The tube 12 is provided as a sectional device having a tube section 14 extending to one side of the combine and the tube section 15 extending to the opposite side thereof. There is a baffle plate 16 below the spout 11 in the tube 12 at the intersection of the end of the respective tube sections 14 and 15 which is hingedly mounted in the tube by a transversely extending hinge rod 17 with a lever arm 18 at one end of the hinge tube. The lever arm 18 is provided with a handle 19, remote from the combine and available to the hand of the operator thereof. By this handle 19 the operator may direct the grain material to the tube section 14 or 15 depending upon the choice of the operator.

For an ordinary type of combine, there is provided a clutch shaft 20 which extends outwardly from the combine and is operated by a hand lever 21 connected to the clutch shaft 20, so that the clutch shaft may be operated by the hand of the person operating the combine. A pin 20′ pivotally connects the connector 22 to the grain inlet pipe 10. This connector 22 is bifurcated at both ends thereof as indicated by the reference character 24, the end of the clutch shaft 20 being engageable in one end of the connector 22 while the hand actuated lever 25 is pivotally connected in the other bifurcated end 24 by the hinge pin 26 which extends transversely of the connector 22 and the hand actuated shaft 25. The grain is hand bagged alternately at the ends of the tubes 14 and 15. A vertically extending rod 27, having spaced notches 28 thereon, is secured to the grain pipe 29 of the combine by bolt 27′. The shaft 20 is located with respect to rod 27 so that the lever 21 may be positioned in a predetermined notch 28 holding the lever 21 in its proper position so that the grain will be distributed or passed from either the tube 14 or 15, whence the grain itself may be bagged and shipped to the location desired by the operator of the combine.

There is provided a grain bagging device 30 at each other end of the tube 12 so that the grain from there may also be bagged. The grain bagging device 30 has a horizontally extending clamping plate 31 thereon with a vertically extending sleeve or nipple 32 in the center thereof, which is open at the opposite ends and engageable through the plate 31 after the grain has been passed therethrough. An angled tube connector pipe 34 is secured to the upper end of the sleeve 32 and engages in the lower end of the spout 11 so that the grain passing from the combine will be passed through the tube 12 and to the clamping means 30 herein described.

The clamping plate 31 is provided with a pair of transversely spaced apart upstanding posts 35 between which is slidably supported a vertically extending rod 36 with a longitudinally extending slot 37 at the lower end thereof. The pin 38 engages through the slot 37, being fixed at its opposite ends to the clamping block 39, so that the clamping block will be slidably and pivotally connected to the lower end of the rod 36 when a bag is to be clamped between the clamping block 39 and the clamping plate 31.

The rod 36 is angled at the upper end thereof in its formation thus providing an angled upper end 40 with the extreme end of this rod end 40 being carried by the upper pin 41 which is under the control of the operator of the combine.

A clamp operating lever 42 is mounted between the upper ends of the upstanding posts 35 in such manner as to be rocked upon rotation of the rotatable pin 44. Said lever is bifurcated at one end thereof to provide for pivotal connection thereto of the upper end 40 of the rod 36, by means of the pin 41. The other end of lever 42 is rigidly connected to the pin 44 for rotation therewith.

The bifurcated end of the lever 42 will provide for the pivotal movement of the upper end of the rod 36 and the other end of the lever 42 will be engageable through the manually rotatable pin 44 at the upper end of the posts 35. One side of the bolcks 39 is provided with a vertically extending slot 45 therein in which the transversely extending pin 46 will connect the lower end of the actuating rod 36.

A coil spring 47, about the rod 36, between the posts, will continually urge the clamping block 39 downwardly toward the clamping plate 31, the coil spring 47 being adjustable by the threaded engagement of the nut 48 adjacent the upper end of the rod 36 while the lower end of the coil spring 47 is engageable with the metal washer or stop 49 at the lower end of the rod.

In order to manually effect the clamping of a bag to the clamping device there is provided a longitudinally extending elongated rod 50 on the pin 44 having the handle 51 spaced from the pin 44 as well as the clamping device.

The upper open end of a bag B is adapted to be clamped and unclamped with the clamping device and clamped between the clamping block 39 and the clamping plate 31 when the material is to be fed through a selected one of the ends of the tube 12 while the combine is in operation.

In the use and operation of the combine constructed as above, the direction of movement of the grain in the tube 12 is controlled by an operator actuating the baffle plate 16 and the clamping of the bag B is accomplished by the operator actuating the handle 51, on the rod 50, at the desired location of the clamping device.

While the specific details of one embodiment of this invention have been herein shown and described, the invention is not confined thereto as changes and alterations may be made without departing from the spirit and scope thereof as defined in the appended claim.

I claim:

A bagging means for a combine comprising a circular clamping plate, a nipple rising from said plate, an obliquely-angled tubular connector carried by said nipple and adapted for connection with the grain discharge tube of the combine, a pair of upright parallel bars fixed to said nipple, a movable bag clamping member slidable between said bars, said member having a vertically elongated opening, a bolt extending between said bars and loosely engaging through said opening, a clamp operating lever rockably disposed between the upper ends of said bars, an inverted L-shaped member pivotally connected at the short side thereof to said lever, said clamping member having a recess in the upper side thereof, the other or long side of said L-shaped member engaging in said recess of said clamping member and having an elongated opening, a bolt carried by said movable clamping member intersecting said recess and loosely engaging through said latter opening, a spring about said long side of said L-shaped member, a spring tensioning nut on said long side, and a lever operating handle fixed relative to said lever.

References Cited in the file of this patent

UNITED STATES PATENTS

| | | |
|---|---|---|
| 266,608 | Cooper | Oct. 31, 1882 |
| 1,036,225 | Hall | Aug. 20, 1912 |
| 1,822,747 | Richardson | Sept. 8, 1931 |